US007692734B2

(12) United States Patent
Fujita et al.

(10) Patent No.: US 7,692,734 B2
(45) Date of Patent: Apr. 6, 2010

(54) LIQUID CRYSTAL DEVICE AND ELECTRONIC APPARATUS

(75) Inventors: Shin Fujita, Suwa (JP); Yutaka Kobashi, Mizuho (JP); Shin Koide, Chino (JP); Tomoyuki Ito, Okaya (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 485 days.

(21) Appl. No.: 11/521,452

(22) Filed: Sep. 15, 2006

(65) Prior Publication Data

US 2007/0070264 A1 Mar. 29, 2007

(30) Foreign Application Priority Data

Sep. 28, 2005 (JP) ............................. 2005-281400

(51) Int. Cl.
*G02F 1/1335* (2006.01)

(52) U.S. Cl. .......................................... 349/61; 349/68

(58) Field of Classification Search .................. 349/68, 349/61
See application file for complete search history.

(56) References Cited

U.S. PATENT DOCUMENTS

| 6,678,026 | B2 * | 1/2004 | Maeda et al. ................ 349/113 |
| 7,460,103 | B2 * | 12/2008 | Konno et al. ................ 345/102 |
| 2003/0103177 | A1 * | 6/2003 | Maeda et al. ................ 349/113 |
| 2004/0046900 | A1 * | 3/2004 | Boer et al. .................... 349/43 |
| 2004/0075045 | A1 | 4/2004 | Hermsen |
| 2004/0113877 | A1 * | 6/2004 | Abileah et al. ................ 345/92 |
| 2004/0141137 | A1 | 7/2004 | Hirabayashi |
| 2005/0134751 | A1 * | 6/2005 | Abileah et al. ................ 349/42 |
| 2005/0184952 | A1 * | 8/2005 | Konno et al. ................ 345/102 |
| 2005/0285985 | A1 * | 12/2005 | Boer et al. .................... 349/42 |
| 2007/0211013 | A1 * | 9/2007 | Uehara et al. ............... 345/102 |
| 2008/0062156 | A1 * | 3/2008 | Abileah et al. .............. 345/204 |

FOREIGN PATENT DOCUMENTS

| CN | 1650338 A | 8/2005 |
| JP | A-03-249622 | 11/1991 |

(Continued)

OTHER PUBLICATIONS

U.S. Appl. No. 11/514,176, filed in the name of Shin Fujita et al. on Sep. 1, 2006.

(Continued)

*Primary Examiner*—K. Cyrus Kianni
(74) *Attorney, Agent, or Firm*—Oliff & Berridge, PLC

(57) ABSTRACT

Provided is a liquid crystal device including: a liquid crystal panel which includes first and second substrates supporting a liquid crystal layer in a sandwich manner and a sealing material disposed between the first and second substrate to seal the liquid crystal layer, and on which illumination light is irradiated from the rear side thereof; an optical plate disposed in the front side of the liquid crystal panel; and a control element that controls a display status of an image displayed on the liquid crystal panel, wherein: the liquid crystal panel includes a light receiving element that receives ambient light; and the light receiving element is disposed in a position where at least a portion of a light receiving surface thereof does not overlap the optical plate when seen from a plan view.

8 Claims, 7 Drawing Sheets

FOREIGN PATENT DOCUMENTS

| | | |
|---|---|---|
| JP | 04-316950 | 11/1992 |
| JP | A-05-265401 | 10/1993 |
| JP | A 9-146073 | 6/1997 |
| JP | A 11-135291 | 5/1999 |
| JP | 3015400 B2 | 12/1999 |
| JP | A-2000-122574 | 4/2000 |
| JP | A 2003-29239 | 1/2003 |
| JP | A-2003-78838 | 3/2003 |
| JP | A-2003-107422 | 4/2003 |
| JP | 2004-78160 | 3/2004 |
| JP | A 2004-363421 | 12/2004 |
| JP | A-2005-70065 | 3/2005 |
| JP | 2005-121997 | 5/2005 |
| JP | A 2005-121977 | 5/2005 |
| KR | 10-2004-0025584 | 3/2004 |

OTHER PUBLICATIONS

U.S. Patent Application, filed in the name of Shin Fujita et al., on Sep. 25, 2006.

* cited by examiner

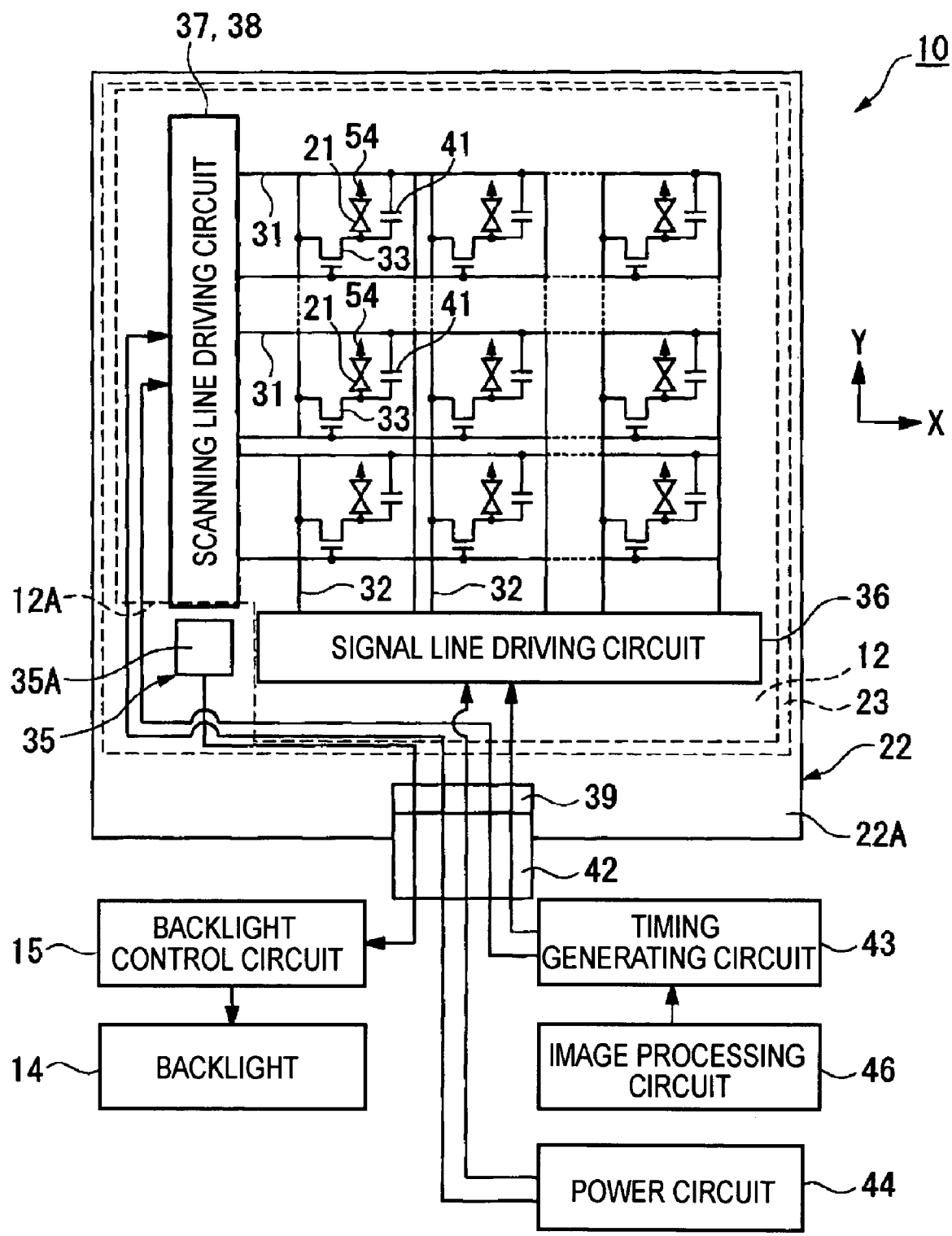

LIQUID CRYSTAL DEVICE AND ELECTRONIC APPARATUS

This application claims the benefit of Japanese Patent Application No. 2005-281400, filed Sep. 28, 2005. The entire disclosure of the prior application is hereby incorporated by reference herein in its entirety.

BACKGROUND

1. Technical Field

The present invention relates to a liquid crystal device that irradiates illumination light from the rear side of a liquid crystal panel, and an electronic apparatus.

2. Related Art

In general, a liquid crystal device used as a display unit of an electronic apparatus includes a liquid crystal panel and a backlight which is disposed at the rear side of the liquid panel as an illumination element. In order to reduce power consumption, a portable electronic apparatus such as a mobile phone uses a semi-transmissive reflective liquid crystal device that includes a transmissive display mode in which displaying is performed by transmitting illumination light of the backlight, and a reflective display mode in which displaying is performed by reflecting ambient light that exists outside a mobile phone casing.

The backlight of the liquid crystal device may be an LED (Light Emitting Diode). A control circuit that controls illumination light intensity by regulating current supplied to the LED is installed in the liquid crystal device. In order for the liquid crystal panel to perform displaying with good quality according to external brightness of the electronic apparatus, an liquid crystal device has been proposed in which an optical sensor that measures ambient light intensity is installed, so that the control circuit regulates backlight intensity based on the measurement result obtained by using the optical sensor (see JP-A-2005-121997).

It is desirable that a detection position of the ambient light to be detected by the optical sensor is located near a display area of the liquid crystal panel. Thus, the optical sensor may be installed inside the liquid crystal panel.

In the past, the liquid crystal device had some problems as follows. That is, polarizing plates are respectively disposed in the front side and the rear side of the display area of the liquid crystal panel. In general, since un-polarized ambient light is transmitted through the polarizing plate disposed in the front side, ambient light intensity reduces by approximately half. For this reason, intensity of light received into a light receiving surface of the optical sensor is significantly decreased by the polarizing plate, and thus the ambient light cannot be sufficiently received at the light receiving surface. Accordingly, in order for the ambient light detected by the optical sensor to have good sensitivity, the light receiving area of the optical sensor disadvantageously needs to be large. Further, since the light receiving area is large, the display area of the liquid crystal device has to be narrowed, and exterior design of the liquid crystal device deteriorates.

SUMMARY

An advantage of some aspects of the invention is to provide a liquid crystal device in which ambient light can be sufficiently received into a light receiving surface, and an electronic apparatus.

According to an aspect of the invention, there is provided a liquid crystal device including: a liquid crystal panel which includes first and second substrates supporting a liquid crystal layer in a sandwich manner and a sealing material disposed between the first and second substrate to seal the liquid crystal layer, and on which illumination light is irradiated from the rear side thereof; an optical plate disposed in the front side of the liquid crystal panel; and a control element that controls a display status of an image displayed on the liquid crystal panel. Further, the liquid crystal panel includes a light receiving element that receives ambient light. Furthermore, the light receiving element is disposed in a position where at least a portion of a light receiving surface thereof does not overlap the optical plate when seen from a plan view.

Since the light receiving element is disposed in a position where at least a portion of the light receiving surface thereof does not overlap the optical plate when seen from a plan view, the ambient light can reach the light receiving surface without its intensity being significantly decreased or blocked by the sealing material or the optical plate. Therefore, the ambient light intensity can be avoided from significant decreasing so as to be sufficiently received into the light receiving surface. As a result, there is no need to increase a light receiving area. Accordingly, exterior design does not deteriorate without having to downsize the display area of the liquid crystal device surrounded by the sealing material.

It is preferable that the light receiving element is disposed in a position where at least a portion of the light receiving surface thereof does not overlap the sealing material and the optical plate when seen from a plan view. Since the light receiving element is disposed in a position where at least a portion of the light receiving surface thereof does not overlap the sealing material and the optical plate when seen from a plan view, as described above, the ambient light intensity can be avoided from significant decreasing so as to be sufficiently received. Thus, there is no need to increase a light receiving area. Accordingly, exterior design does not deteriorate without having to downsize the display area of the liquid crystal device.

It is preferable that the light receiving element is disposed in a position where the light receiving surface thereof overlaps the liquid crystal layer when seen from a plan view, and a transmission area which allows the ambient light to be transmitted is formed on the optical plate at a position where the optical plate overlaps at least a portion of the light receiving surface.

Since the transmission area is formed on the optical plate, the ambient light can reach the light receiving surface without its intensity being significantly decreased or blocked by the optical plate.

It is preferable that the liquid crystal panel includes a shielding layer, and a transmission area which allows the ambient light to be transmitted is formed on the optical plate at a position where the optical plate overlaps at least a portion of the light receiving surface.

Since the shielding layer transmission area is formed on the shielding layer, the ambient light can reach the light receiving surface without its intensity being significantly decreased or blocked by the optical plate. Accordingly, the ambient light intensity can be protected against reduction in the light receiving surface.

It is preferable that the first substrate includes a long protrusion in which the first substrate protrudes with respect to the second substrate when seen from a plan view, and the light receiving surface of the light receiving element is disposed on the long protrusion.

Since the light receiving area of the light receiving element is formed on the long protrusion, the ambient light can reach to the light receiving surface without having to pass through the optical plate.

It is preferable that the optical plate is a polarizing plate.

Since the polarizing plate is not disposed in a position where it overlaps the light receiving surface when seen from a plan view in a condition that the ambient light intensity is reduced by approximately half by the polarizing plate, the ambient light can reach the light receiving surface without its intensity being significantly decreased or blocked by the optical plate.

It is preferable that an illumination element that irradiates the illumination light onto the liquid crystal panel, wherein the control element controls the illumination light intensity based on the ambient light intensity received by means of the light receiving element.

Since the control element controls the illumination light intensity irradiated from the illumination element based on the ambient light intensity, power consumption of the illumination element can be reduced while displaying is appropriately performed irrespective of brightness of the ambient light.

According to another aspect of the invention, there is provided an electronic apparatus having the aforementioned liquid crystal device.

Accordingly, since the electronic apparatus has the aforementioned liquid crystal device, the ambient light intensity can be sufficiently received into the light receiving surface, and exterior design does not deteriorate without having to downsize the display area of the liquid crystal device.

BRIEF DESCRIPTION OF THE DRAWINGS

The invention will be described with reference to the accompanying drawings, wherein like numbers reference like elements.

FIG. 3 is a circuit diagram of the liquid crystal device of FIG. 1.

DESCRIPTION OF EXEMPLARY EMBODIMENTS

Figure 1:
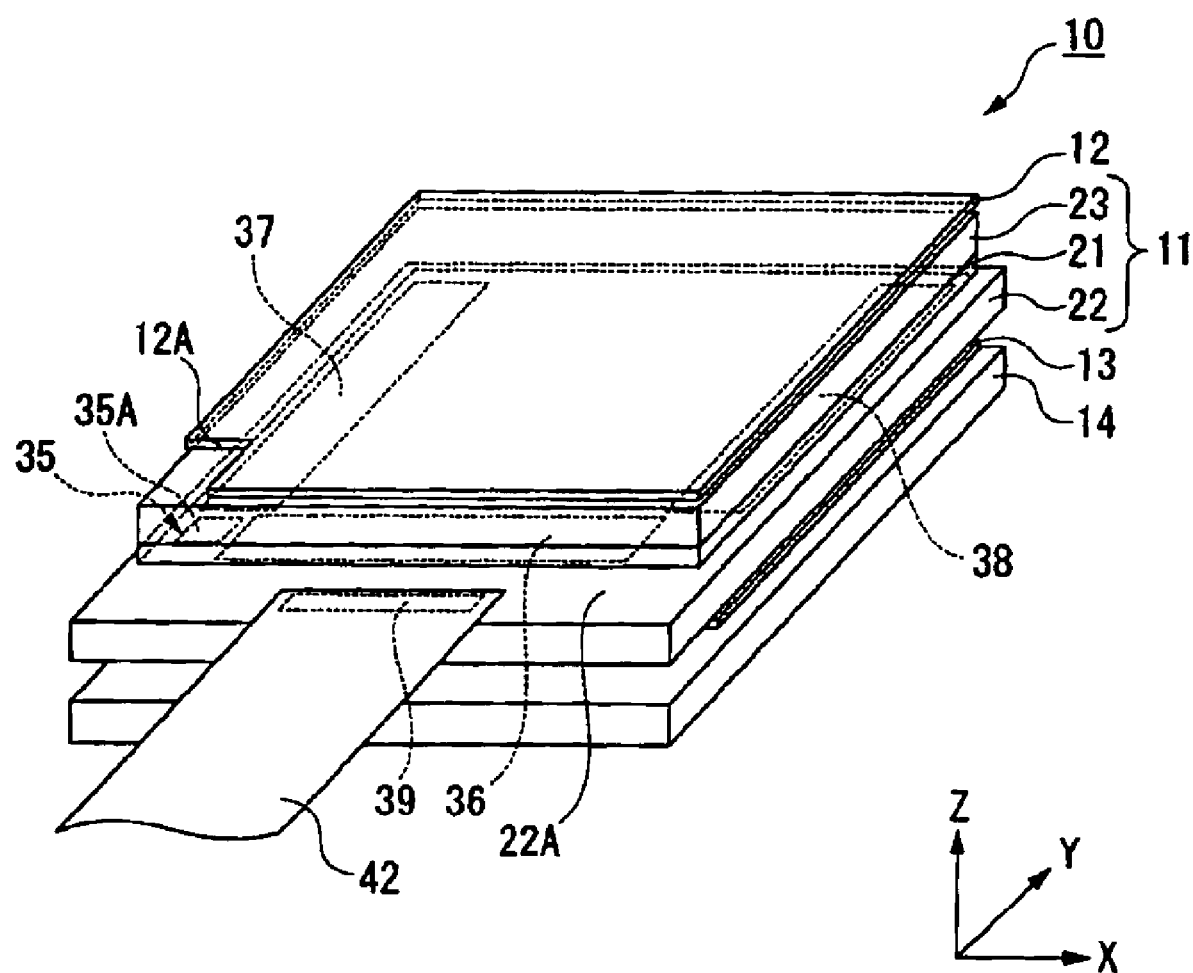
FIG. 1 is a schematic perspective view of a liquid crystal device according to a first embodiment of the invention.
Figure 2A:
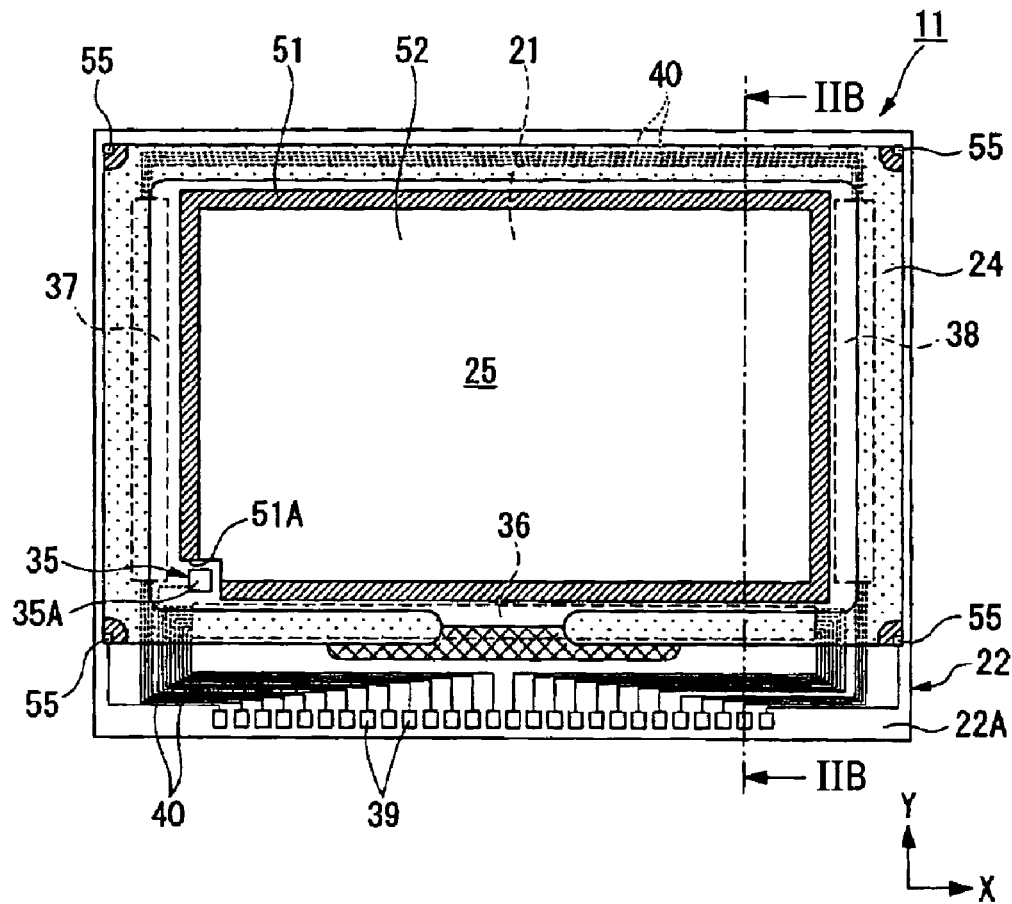
FIG. 2A is a plan view of the liquid crystal panel of FIG. 1.
Figure 2B:
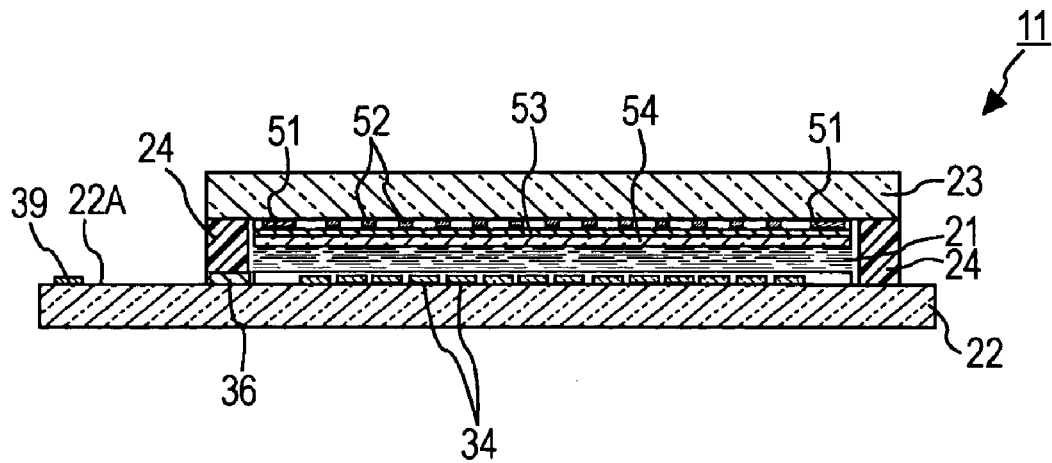
FIG. 2B is a cross-sectional view of the liquid crystal panel of FIG. 1.

Hereinafter, a liquid crystal device and an electronic apparatus according to a first embodiment of the invention will be described with reference to the accompanying drawings. FIG. 1 is a schematic perspective view of a liquid crystal device according to a first embodiment of the invention. FIG. 2A is a plan view of a liquid crystal panel. FIG. 2B is a cross-sectional view of FIG. 2A, viewed along the line IIB-IIB. FIG. 3 is a circuit diagram showing a circuit configuration of a liquid crystal display.

A liquid crystal device 10 is a semi-transmissive reflective TFT (Thin Film Transistors) active matrix type liquid crystal device. Further, as shown in FIGS. 1 to 3, the liquid crystal device 10 includes a liquid crystal panel 11, a first polarizing plate (an optical plate) 12 and a second polarizing plate 13 which are respectively disposed in the front side and the rear side of the liquid crystal panel 11, a backlight (an illumination element) 14 disposed in the rear side of the liquid crystal panel 11, and a backlight control circuit (a control element) 15 that controls illumination light intensity by regulating current supplied to the backlight 14.

As shown in FIGS. 1, 2A, and 2B, the liquid crystal panel 11 includes a TFT array substrate (a first substrate) 22 and an opposite substrate (a second substrate) 23 which support an liquid crystal layer 21 in a sandwich manner, and a sealing material 24 which is disposed at edges of a surface where the first and second substrate 22 and 23 face each other, has a substantially rectangular shape when seen from a plan view, and seals the liquid crystal layer 21. The liquid crystal panel 11 includes an image display area 25 in which the TFT array substrate 22 and the opposite substrate 23 overlap each other, and which is disposed inside a sealing area surrounded by a peripheral shielding layer (a shielding layer) 51 to be described below.

In the liquid crystal panel 11, the TFT array substrate 22 is a rear side substrate, whereas the opposite substrate 23 is a front side substrate.

For example, the liquid crystal layer 21 is formed of a liquid crystal in which one type or multiple types of nematic liquid crystals are mixed, and is disposed in a specific alignment state between alignment films (not shown) respectively formed on the TFT array substrate 22 and the opposite substrate 23. The liquid crystal layer 21 may have a TN (Twisted Nematic) mode that uses a liquid crystal having a positive dielectric anisotropy or a VAN (Vertical Aligned Nematic) mode that uses a liquid crystal having a negative dielectric anisotropy.

The TFT array substrate 22 has a rectangular shape when seen from a plan view, and is formed of an optical transmissive material such as quartz, glass, plastic, or the like. Further, the TFT array substrate 22 is formed with a long protrusion 22A which protrudes outwards with respect to the opposite substrate 23 in one edge thereof.

A plurality of scanning lines 31, signal lines 32, TFTs 33, and pixel electrodes 34, a light receiving element (a light receiving unit) 35, a signal line driving circuit 36, and scanning line driving circuits 37 and 38 are disposed in an area where the TFT array substrate 22 overlaps the opposite substrate 23 when seen from a plan view.

Terminals 39 of the signal line driving circuit 36, the scanning line driving circuits 37 and 38, and the light receiving element 35 are respectively disposed on the long protrusion 22A of the TFT array substrate 22, and are electrically connected to these circuits 36, 37, and 38 and the element 35 by the use of wires 40.

As shown in FIG. 3, the scanning lines 31 are sequentially disposed in direction X, and are formed of a metal such as aluminum. Further, as shown in FIG. 3, the signal lines 32 are sequentially disposed in direction Y, such that they respectively intersect the scanning lines 31. Similarly to the scanning lines 31, the signal lines 32 are formed of a metal such as aluminum. Pixel areas are formed by the scanning lines 31 and the signal lines 32.

Each pixel area is surrounded by each scanning line 31 and each signal line 32. Further, when seen from a plan view, the pixel area is formed to overlap an area where a color filter (not shown) is disposed in the opposite substrate 23.

For example, each of the TFTs 33 is composed of an n-type transistor, and is disposed at an intersection point between each of the scanning lines 31 and each of the signal lines 32. Further, when each of the TFTs 33 is formed, an amorphous polysilicon layer or a polysilicon layer crystallized with the amorphous polysilicon layer is partially formed on the upper surface of the TFT array substrate 22. Thereafter, impurities are partially introduced or activated.

The scanning lines 31 are respectively electrically connected to gates of the TFTs 33, and the pixel electrodes 34 are respectively electrically connected to drains of the TFTs 33.

In order to prevent an image signal stored in the pixel electrodes 34 from leaking, retention capacitors 41 are connected to the pixel electrodes 34 in parallel.

The pixel electrodes 34 are formed of an optical transmissive conductive material such as ITO (Indium Tin Oxide), and are respectively arranged to face an opposite electrode 54 (to be described later) disposed on the opposite substrate 23. Further, the pixels electrodes 34 support the liquid crystal layer 21 in a sandwich manner between the pixel electrodes 34 and the opposite electrode 54 which is formed on the opposite substrate 23 to face the pixel electrodes 34. Furthermore, the pixel electrodes 34 are provided with a reflection layer (not shown).

The light receiving element 35, as shown in FIG. 3, is formed in one angular portion within the image display area 25 on the TFT array substrate 22. For example, the light receiving element 35 is composed of a photodiode, a phototransistor, and so on.

Here, for example, if the light receiving element 35 is composed of a PIN (Positive Intrinsic Negative)-type photodiode, the PIN-type photodiode can be formed such that, when a semiconductor layer constituting the light receiving element 35 is defined as an intrinsic semiconductor region (I layer) in which an intrinsic semiconductor or a negligible concentration of impurity is introduced, a p-type semiconductor region (P layer) is formed in one side of the intrinsic semiconductor region (I layer), whereas an n-type semiconductor region (N layer) is formed on the other side thereof. By utilizing a semiconductor layer that is formed in the same process as that of the TFT 33, the PIN-type photodiode may be formed in the same manufacturing process as that of the TFT 33.

When seen from a plan view, a portion of the signal line driving circuit 36 is covered by the sealing material 24, and another portion thereof is disposed within the image display area 25. Further, the signal line driving circuit 36 is constructed to supply an image signal to the plurality of signal lines 32. Here, the image signal stored in the signal lines 32 by the signal line driving circuit 36 may be supplied in the line order, or may be supplied for each group with respect to the plurality of adjacent signal lines 32.

Similarly to the signal line driving circuit 36, when seen from a plan view, the scanning line driving circuits 37 and 38 are constructed such that a portion thereof is covered by the sealing material 24, while anther portion thereof is disposed within the image display area 25, and a scan signal is supplied to the plurality of scanning lines 31 at a predetermined timing in the form of pulse in the line order.

The signal line driving circuit 36 and the scanning line driving circuits 37 and 38 are composed of an electrical circuit in which a transistor, a diode, a capacitor, and so on are combined, and are formed by partially introducing or activating impurities with respect to an amorphous polysilicon layer or a polysilicon layer crystallized with the amorphous polysilicon layer which is partially formed on the upper surface of the TFT array substrate 22, like the TFTs 33 or the light receiving element 35. Therefore, the signal line driving circuit 36 can be formed by the same manufacturing process as those of the TFT 33 or the light receiving element 35.

The terminals 39 are connected with one end of a flexible substrate 42 by using an anisotropic conductive material such as an ACF (Anisotropic Conductive Film) or an ACP (Anisotropic Conductive Paste). Via the flexible substrate 42, a timing generating circuit 43 and the scanning line driving circuits 37 and 38 are electrically connected, a power circuit 44, the signal line driving circuit 36, and the scanning line driving circuits 37 and 38 are electrically connected, and the light receiving element 35 and the backlight control circuit 15 are electrically connected. The timing generating circuit 43 is connected to an image processing circuit 45.

Like the TFT array substrate 22, the opposite substrate 23 has a rectangular shape when seen from a plan view, and is formed of an optical transmissive material such as glass or plastic. The lower surface of the liquid crystal layer 21 of the opposite substrate 23 is laminated with the peripheral shielding layer 51, a display area shielding layer 52, a color filter layer 53, the opposite electrode 54, and an alignment film (not shown), in this order.

The peripheral shielding layer 51 has a shape of a rectangular frame when seen from a plan view, is disposed along the inner circumferential surface of the sealing material 24, and defines the image display area. When seen from a plan view, a shielding layer notch (a shielding layer transmission area) 51A is formed at or near a position where the peripheral shielding layer 51 overlaps a light receiving surface 35A.

The display area shielding layer 52 has a grid or stripe shape when seen from a plan view, and is disposed to cover the image display area 25, an area inside the peripheral shielding layer 51.

The color filter layer 53 is composed of a plurality of color filters which are arranged in a matrix form when seen from a plan view, so as to correspond to each pixel area described above.

Like the pixel electrode 34, the opposite electrode 54 is a flat layer formed of an optical transmissive conductive material such as ITO.

Four angular portions of the opposite substrate 23 are disposed with upper and lower conductive materials 55 which function as upper and lower conductive terminals between the opposite substrate 23 and the TFT array substrate 22. The upper and lower conductive materials 55 serve to electrically connect the opposite substrate 23 and the TFT array substrate 22.

The sealing material 24 has a shape of a rectangular frame when seen from a plan view, and is in contact with the TFT array substrate 22 and the opposite substrate 23. The sealing material 24 is composed of such as a UV curable resin, a thermosetting resin, etc, and has undergone a curing process by irradiating an ultraviolet ray or heating after being coated at a specific position of the TFT array substrate 22. Further, the sealing material 24 is mixed with a gap material such as glass fiber or glass beads, in order to allow distance (a gap between substrates) between the TFT array substrate 22 and the opposite substrate 23 to have a predetermined value.

The first and second polarizing plates 12 and 13 respectively transmit only linear polarization that vibrates in a specific direction. The first polarizing plate 12 is disposed in the front side of the liquid crystal panel 11, and the second polarizing plate 12 is disposed in the rear side of the liquid crystal panel 11. Further, the first and second polarizing plates 12 and 13 are disposed such that they intersect with each other by approximately 45 degrees against a rubbing direction of the alignment film while transmission axes thereof being substantially perpendicular to each other.

In the first polarizing plate 12, a notch (a transmission area) 12A is formed at or near one angular portion where the light receiving surface 35A of the light receiving element 35 overlaps the first polarizing plate 12 when seen from a plan view. Accordingly, ambient light that incidents onto the notch 12A of the first polarizing plate 12 from the front side of the first polarizing plate 12 does not depend on its vibration direction, and moves towards the light receiving surface 35A without its intensity being decreased by the first polarizing plate 12.

The backlight 14 is composed of a light source which is formed of a white LED, or the like, a light guide plate which guides illumination light irradiated from the light source, and a reflector.

The backlight control circuit 15 is electrically connected to the light receiving element 35 and the backlight 14, and controls the intensity of the illumination light irradiated from the backlight 14 based on the intensity of the ambient light received from the light receiving surface 35A of the light receiving element 35.

Figure 4:
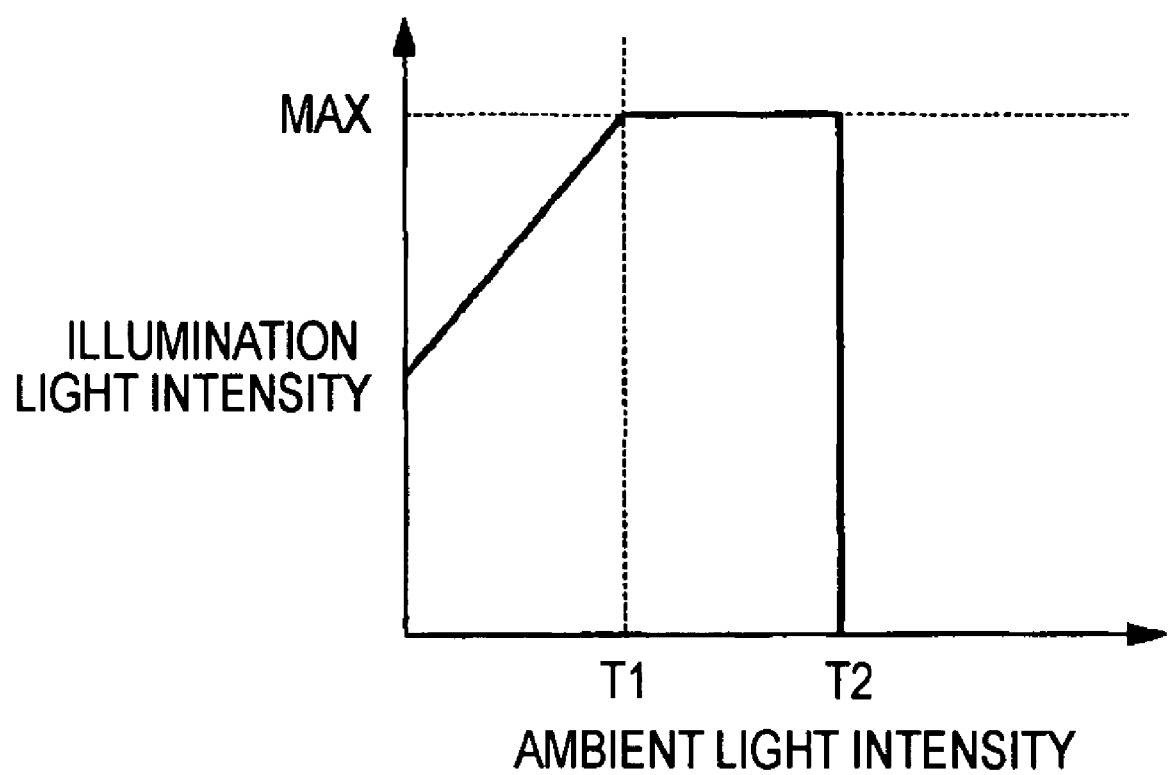
FIG. 4 is a graph of illumination light intensity with respect to ambient light intensity.

FIG. 4 is a graph of illumination light intensity irradiated from the backlight 14 by the backlight control circuit 15 with respect to ambient light intensity.

Referring to FIG. 4, the backlight control circuit 15 increases current supplied to the light source of the backlight 14 so that the intensity of the illumination light irradiated from the backlight 14 is gradually increased along with the ambient light intensity. Further, the backlight control circuit 15 supplies current to the light source, so that the illumination light can have its maximum intensity when the ambient light intensity reaches a threshold value T1. Furthermore, the backlight control circuit 15 stops the supply of current from the light source when its intensity reaches a threshold value T2 higher than the threshold value T1, so as to allow the backlight 14 to stop irradiating.

That is, when the ambient light intensity is equal to or less than the threshold value T2, the liquid crystal device 10 is in a transmissive display mode in which displaying is performed by transmitting the illumination light irradiated from the backlight through the liquid crystal panel 11.

On the other hand, when the ambient light intensity is greater than the threshold value T2 that is the maximum illumination light intensity irradiated from the backlight 14, the liquid crystal device 10 is in a reflective display mode in which displaying is performed by reflecting the reflected ambient light from the reflection layer disposed within the liquid crystal panel 11 so as to be used as illumination light.

Figure 5:
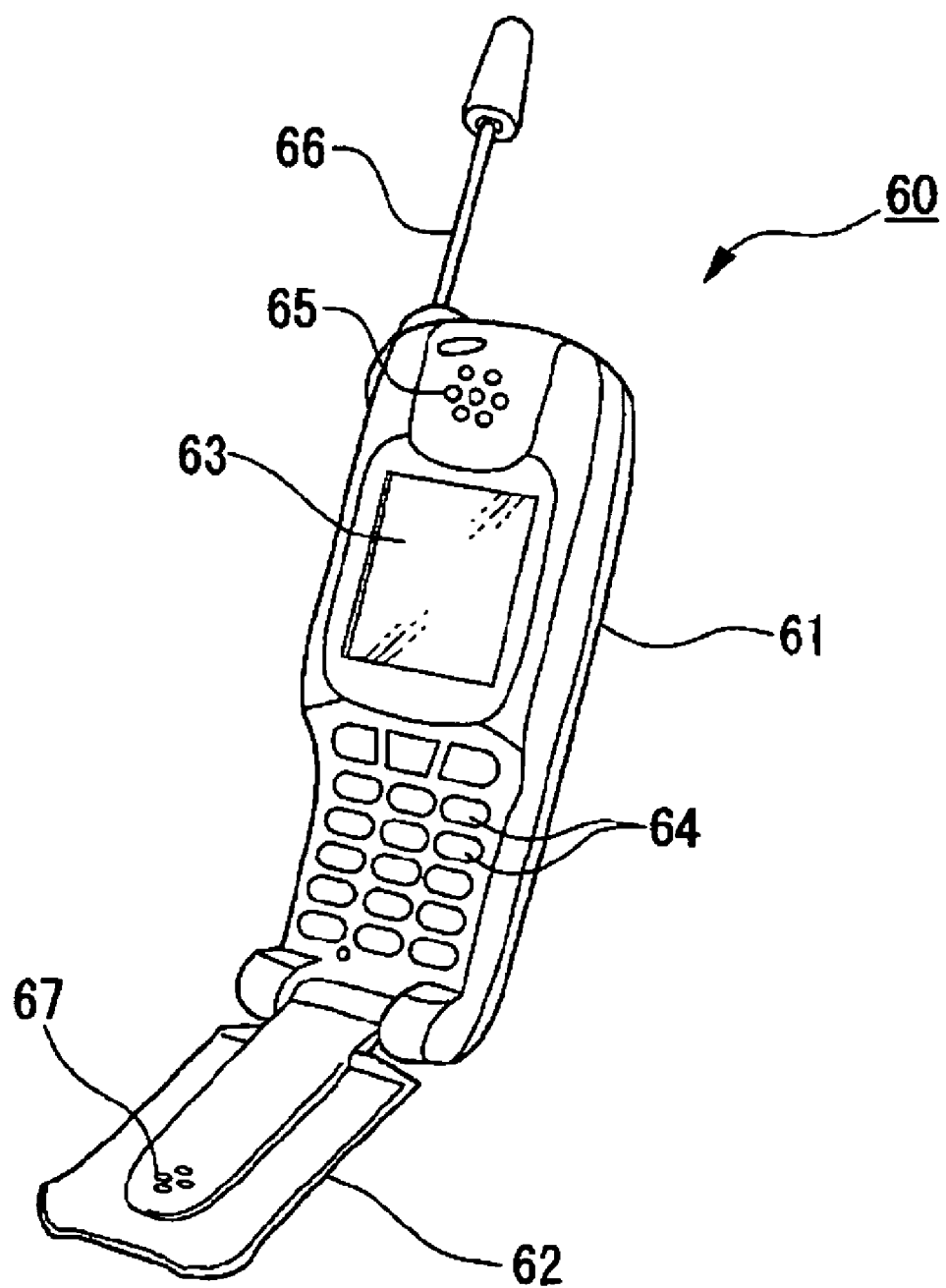
FIG. 5 is a perspective view of a mobile phone according to a first embodiment of the invention.

The liquid crystal device 10 having the aforementioned structure is applied to a mobile phone (an electronic apparatus) 60 as shown in FIG. 5. FIG. 5 is a perspective view of a mobile phone.

The mobile phone 60 includes a body 61 and a cover 62 which is connected to the lower end of the body 61 via a hinge mechanism. The cover 62 can be freely open and closed against the body 61. Further, the body 61 includes a display unit 63 composed of the aforementioned liquid crystal device 10, an operation unit 64 arranged with a plurality of operation keys, an earpiece 65, and an antenna 66. The cover 62 includes a mouthpiece 67.

Now, a method of controlling the illumination light intensity of the backlight 14 based on the ambient light intensity in the mobile phone 60 employing the liquid crystal device 10 having the aforementioned structure will be described.

When the ambient light incidents onto the liquid crystal device 10 from the display unit 63, the light receiving element 35 receives the ambient light. In this case, since the notch 12A is formed on the first polarizing plate 12 at a position where the light receiving surface 35A of the light receiving element 35 overlaps the first polarizing plate 12, the ambient light does not depend on its vibration, and moves towards the light receiving surface 35 without its intensity being significantly decreased by the first polarizing plate 12. Further, since the light receiving surface 35A is not covered by the sealing material 24, and shielding layer notches 51A and 52A are respectively formed at the peripheral shielding layer 51, the ambient light moves towards the light receiving surface 35A without its intensity being decreased by the ambient shielding layer 51.

The light receiving element 35 converts the received ambient light into an electrical signal using photoelectric conversion, and outputs the electric signal to the backlight control circuit 15.

The backlight control circuit 15 estimates the illumination light intensity of the backlight 14 corresponding to the ambient light intensity in response to the received electrical signal, and controls current supplied to the backlight 14.

For example, if the ambient light intensity is less than the threshold value T1, as shown in FIG. 4, the illumination light intensity is controlled to be gradually increased along with the ambient light intensity, and when the ambient light intensity reaches the threshold value T1, its maximum intensity becomes the ambient light intensity. In this case, the transmissive display mode is set. Further, if the ambient light intensity is equal to or greater than the threshold value T1 and less than the threshold value T2, as shown in FIG. 4, the illumination light intensity is controlled to stay at its maximum value, and the transmissive display mode is set. Furthermore, if the ambient light intensity is greater than the threshold value T2, since the ambient light intensity is sufficiently large, the supply of current to the backlight 14 is stopped, and the reflective display mode is set.

As described above, the transmissive display mode and the reflective display mode are distinguished by controlling the current supplied to the backlight 14 based on the ambient light intensity.

According to the liquid crystal device 10 and the mobile phone 60 having the aforementioned structure, since the light receiving surface 35A is not covered by the sealing material 24 while the notch 12A and the shielding layer notch 51A are respectively formed on the first polarizing plate 12 and the peripheral shielding layer 51, the ambient light can be sufficiently received into the light receiving surface 35A without its intensity being significantly decreased when the ambient light moves towards the light receiving surface 35A. As a result, sensitivity of the light receiving element 35 is sufficiently ensured, and thus a light receiving area of the light receiving surface 35A does not need to be increased. Therefore, the display area of the liquid crystal device 10 does not have to be narrowed, and its exterior design does not deteriorate.

Figure 6:
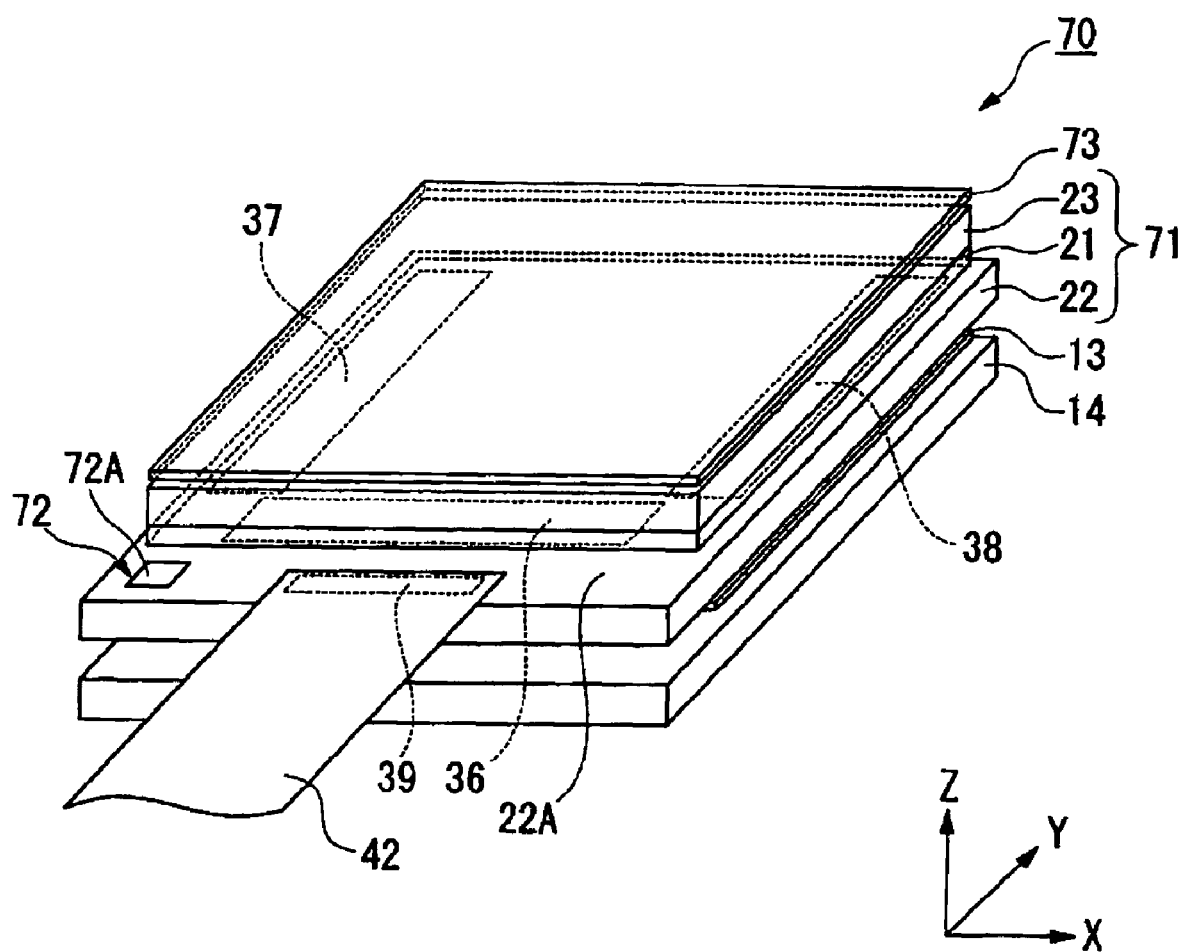
FIG. 6 is a schematic perspective view of a liquid crystal device according to a second embodiment of the invention.
Figure 7:
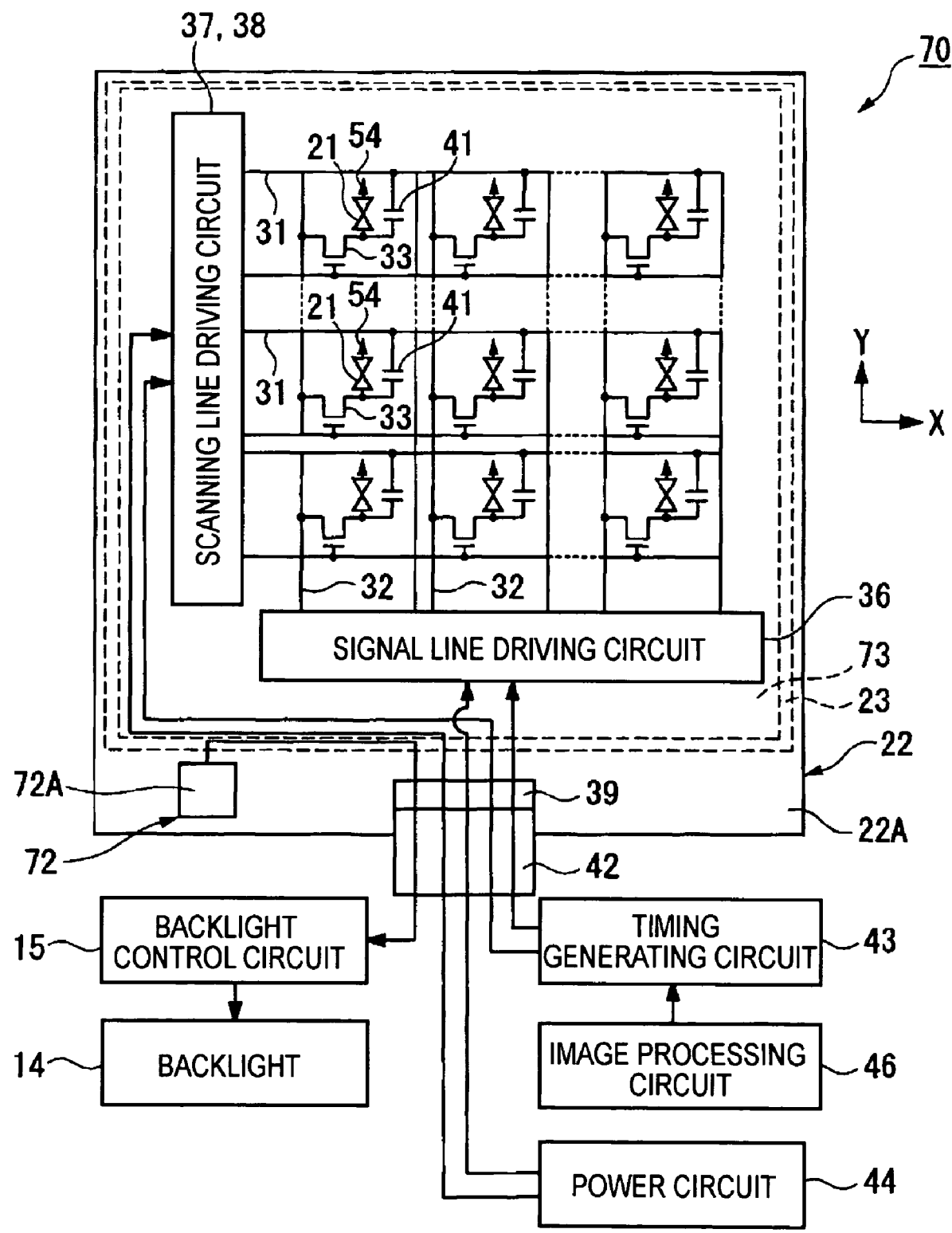
FIG. 7 is a circuit diagram of the liquid crystal device of FIG. 6.

Now, a second embodiment of the invention will be described with reference to FIGS. 6 and 7. The present embodiment has the same basic structure as that of the first embodiment of the invention described above, and additional elements are added to the first embodiment of the invention. Therefore, in FIGS. 6 and 7, like reference numerals denote like elements of FIGS. 1 and 2, and descriptions thereof will be omitted.

Different aspects between the first and second embodiments of the invention lie in that the light receiving surface 35A of the light receiving element 35 is formed within the image display area 25 of the liquid crystal panel 11 in the liquid crystal device 10 in the first embodiment of the invention, whereas a light receiving surface 72A of an optical element 72 is formed in a long protrusion 22A of a liquid crystal panel 71 of a liquid crystal device 70 in the second embodiment of the invention.

Accordingly, a first polarizing plate 73 is disposed to cover the entire opposite substrate 23, and a peripheral shielding layer (not shown) is also disposed to cover the entire image display area.

Since the light receiving surface 72A is formed in the long protrusion 22A, a through-hole is formed in the mobile phone casing so that the ambient light can be transmitted at or near a position where the liquid crystal panel 71 overlaps the light receiving surface 72A when seen from a plan view, with an optical transmissive material being filled therein.

Like in the first embodiment of the invention, in the liquid crystal device 70 having the aforementioned structure, the intensity of received ambient light can be ensured with respect to the light receiving surface 72A without being significantly decreasing by the first polarizing plate 73.

The invention is not limited to the above embodiments, and various changes in form may be made therein without departing from the scope and spirit of the invention.

For example, although the entire light receiving surface is formed not to overlap the polarizing plate when seen from a plan view of the liquid crystal in the above embodiments, the invention may be applied if at least a portion of the light receiving surface is formed not to overlap the polarizing plate. Further, although the entire light receiving surface is formed not to be covered by the sealing material, the invention may be applied if at least a portion of the light receiving surface is formed not to be covered by the sealing material.

In addition, although the light receiving element is formed on the TFT array substrate, it may be formed on the opposite substrate if the ambient light can be received from the light receiving surface. The light receiving element formed on the opposite substrate is electrically connected to the terminals of the TFT array substrate via the upper and lower conductive portions. In this case, the light receiving surface may overlap the sealing material when seen from a plan view.

In addition, although the illumination light intensity is controlled based on the ambient light intensity received from the light receiving element, the invention may have a structure in which an image to be displayed on the liquid panel is corrected based on the ambient light intensity.

In addition, although a transmission area through which the ambient light is transmitted is constructed by forming the notch of the first polarizing plate in the first embodiment of the invention, the invention is not limited to the notch, and the transmission area may be constructed to have other forms such as a through-hole. Further, although the shielding layer notches are respectively formed on the shielding layers, the shielding layer notches may not be formed if the ambient light intensity is less decreased by each of the shielding layers.

In addition, although the liquid crystal panel has an active matrix structure, it may have a passive matrix structure. In this case, a reed-shaped transparent electrode is arranged in a stripe form on one side of a substrate corresponding to the TFT array substrate when seen from a plan view, so as to have a structure in which a reed-shaped transparent electrode is arranged in a stripe form on the other side of a substrate corresponding to the opposite substrate, when seen from a plan view, in a cross manner with respect to the transparent electrode formed on the one side of the substrate.

Although the color filter is formed on the upper surface of the liquid crystal layer of the opposite substrate, the color filter may be formed on the TFT array substrate.

In addition, although a semi-transmissive reflective liquid crystal device is used, a transmissive liquid crystal device may be used.

In addition, although the signal line driving circuit and the scanning line driving circuit are partially covered by the sealing material when seen from a plan view, they may be not covered by the sealing material by placing them within or outside the area of the sealing material. In addition, although the peripheral shielding layer is formed on the opposite substrate, the peripheral shielding layer may be partially or entirely placed on the TFT array substrate as an embedded shielding layer.

In addition, although the timing generator, the power source circuit, the backlight control circuit are connected to the signal line driving circuit, the scanning line driving circuit, the light receiving element, and so on via the flexible substrate, some or all of them may be formed on the TFT array substrate, similarly to the signal line driving circuit or the scanning line driving circuit.

On the surface of the TFT array substrate, in addition to the above signal line driving circuit, the scanning line driving circuit, and so on, a sampling circuit that samples and supplies an image signal to a signal line, a precharge circuit that supplies a precharge signal of a specific voltage to a plurality of signal lines, respectively, prior to the image signal, and a test circuit that tests a mobile phone in terms of quality or defect thereof in a manufacturing or shipment process.

Although the signal line driving circuit or the scanning line driving circuit is formed on the upper surface of the TFT array surface, the invention may have a structure in which a COF (Chip On Film) substrate mounted with a driving LSI having a function of such as the signal line driving circuit or the scanning line driving circuit is electrically and mechanically connected to the scanning line and the signal line of the TFT array substrate via an anisotropic conductive material.

Phase difference plates may be disposed inside a pair of polarizing plates, respectively. In this case, as a phase difference plate, a circular polarizing plate may be constructed along with the pair of polarizing plates by using a $\lambda/4$ plate having a phase difference of approximately ¼ wavelength with respect to a wavelength in a visible light range. Further, a broadband circuit polarizing plate may be constructed by combining a $\lambda/2$ plate and a $\lambda/4$ plate.

An optical compensation film may be optionally placed on either one or both of inner surfaces of the pair of polarizing plates. By means of the optical compensation film, a phase difference of the liquid crystal layer can be compensated for when the liquid crystal device is seen from a plan view or a perspective view, so that light leakage can be reduced so as to increase contrast. In this case, the optical compensation film may be a negative uniaxial medium which is constructed by aligning a discotic liquid crystal molecule or the like having a negative refraction index anisotropy in a hybrid manner. Further, a positive uniaxial medium may be used which is constructed by aligning a nematic liquid crystal molecule or the like having a positive refraction index anisotropy in a hybrid manner. Furthermore, the negative uniaxial medium and the positive uniaxial medium may be combined for use. In addition, a double axial medium of which refraction indices in every direction thereof meet the relation of $nx>ny>nz$, or a negative C-pate may be used.

Although the mobile phone is used as an electronic apparatus in the above embodiments, the invention is not limited to the mobile phone. In other words, if a display unit using the liquid crystal device of the invention is placed, the electronic apparatus may be other types of electronic apparatus such as an electronic book or projector, a personal computer, a digital still camera, a television set, a view finder type or monitor direct-view type video tape recorder, a car navigation system, a pager, an electronic scheduler, a calculator, a word processor, a workstation, a video telephone, a POS terminal, a PDA (Personal Digital Assistant), a touch panel, or the like.

What is claimed is:

1. A liquid crystal device comprising:
a liquid crystal panel including a first and second substrate, the liquid crystal panel being illuminated by illumination light that is incident on a rear side of the liquid crystal panel;
a liquid crystal layer that is arranged between the first and second substrates;
a sealing material arranged between the first and second substrates that seals the liquid crystal layer therebetween;
an optical plate arranged on a front side of the liquid crystal panel; and
a control element that controls an amount of illumination light of an image displayed on the liquid crystal panel, wherein:
the liquid crystal panel includes a light receiving element that receives ambient light,
the light receiving element is arranged in a position where at least a portion of a light receiving surface of the light receiving element does not overlap the optical plate when the liquid crystal panel is seen from a plan view,
the light receiving element is arranged in a position where the light receiving surface of the light receiving element overlaps the liquid crystal layer when seen from a plan view, and
a transmission area which allows the ambient light to be transmitted is formed on the optical plate at a position where the optical plate overlaps at least a portion of the light receiving surface.

2. The liquid crystal device according to claim 1, wherein the light receiving element is arranged in a position where at least a portion of the light receiving surface of the light receiving element does not overlap both the sealing material and the optical plate when the liquid crystal panel is seen from a plan view.

3. The liquid crystal device according to claim 1, wherein:
the liquid crystal panel includes a shielding layer; and
a shielding layer transmission area which allows the ambient light to be transmitted is formed on the shielding layer at a position where the optical plate overlaps at least a portion of the light receiving surface.

4. The liquid crystal device according to claim 1, wherein:
the first substrate includes a long protrusion in which the first substrate protrudes with respect to the second substrate when the liquid crystal panel is seen from a plan view; and
the light receiving surface of the light receiving element is disposed on the long protrusion.

5. The liquid crystal device according to claim 1, wherein the optical plate is a polarizing plate.

6. The liquid crystal device according to claim 1, comprising an illumination element that illuminates the rear side of the liquid crystal panel with the illumination light,
wherein the control element controls an intensity of the illumination light based on an ambient light intensity received from the light receiving element.

7. An electronic apparatus having the liquid crystal device according to claim 1.

8. The liquid crystal device according to claim 1, wherein the transmission area is a notch formed on the optical plate.

* * * * *